US011870616B2

(12) United States Patent
Dietrich et al.

(10) Patent No.: US 11,870,616 B2
(45) Date of Patent: Jan. 9, 2024

(54) POSTAMBLE FOR MULTI-LEVEL SIGNAL MODULATION

(71) Applicant: Micron Technology, Inc., Boise, ID (US)

(72) Inventors: Stefan Dietrich, Türkenfeld (DE); Natalija Jovanovic, Munich (DE); Ronny Schneider, Höhenkirchen-Siegertsbrunn (DE); Martin Brox, Munich (DE); Thomas Hein, Munich (DE); Michael Dieter Richter, Ottobrunn (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/157,815

(22) Filed: Jan. 25, 2021

(65) Prior Publication Data

US 2021/0234732 A1     Jul. 29, 2021

Related U.S. Application Data

(60) Provisional application No. 62/966,445, filed on Jan. 27, 2020.

(51) Int. Cl.
*H04L 25/49*     (2006.01)
*H04L 1/00*     (2006.01)

(52) U.S. Cl.
CPC ........ *H04L 25/4917* (2013.01); *H04L 1/0003* (2013.01)

(58) Field of Classification Search
CPC ......... H04L 2025/03426; H04L 25/067; H04L 25/0204; H04L 1/0054; H04L 27/38;
(Continued)

(56) References Cited

U.S. PATENT DOCUMENTS 5,917,340 A * 6/1999 Manohar .......... H03K 19/00361
326/82
10,878,860 B1 * 12/2020 Gupta .................. G11C 7/1084
(Continued)

FOREIGN PATENT DOCUMENTS

KR     20090131954 A     12/2009

OTHER PUBLICATIONS

ISA/KR, International Search Report and Written Opinion of the International Searching Authority, Int'l Appl. No. PCT/US2021/015014, dated May 18, 2021, Korean Intellectual Property Office, Seo-gu, Daejeon, Republic of Korea, 10 pgs.

*Primary Examiner* — Syed Haider
(74) *Attorney, Agent, or Firm* — Holland & Hart LLP

(57) ABSTRACT

Methods, systems, and devices for postamble for multi-level signal modulation are described. One or more channels of a bus may be driven with a multi-level signal having at least two (2) distinct signal levels. After driving the bus with the multi-level signal, at least one (1) of the channels may be terminated. In some examples, the channel may be terminated to a relatively high signal level. Before termination, the channel may be driven with a postamble having an intermediate signal level. Driving the channel to an intermediate signal level before terminating the channel (e.g., to a high signal level) may avoid maximum transitions of the signal. For example, transitions between a lowest potential signal level and the high signal level (e.g., the termination level) may be avoided.

27 Claims, 9 Drawing Sheets

(58) Field of Classification Search
CPC . H04L 1/0002; H04L 1/0003; H04L 25/4917; H04L 25/493
USPC .......................................................... 375/262
See application file for complete search history.

(56) References Cited

U.S. PATENT DOCUMENTS

| | | | |
|---|---|---|---|
| 2006/0170453 A1* | 8/2006 | Zerbe | H04L 7/0331 |
| | | | 326/37 |
| 2007/0245214 A1* | 10/2007 | Ramamoorthy | H03M 13/11 |
| | | | 714/758 |
| 2013/0251060 A1* | 9/2013 | Ikushima | H04L 25/4919 |
| | | | 375/286 |
| 2014/0153620 A1 | 6/2014 | Longo et al. | |
| 2017/0212695 A1* | 7/2017 | Hollis | G06F 13/4022 |
| 2017/0222845 A1 | 8/2017 | Zerbe et al. | |
| 2018/0137909 A1 | 5/2018 | Shaeffer et al. | |
| 2019/0044769 A1* | 2/2019 | Hollis | G11C 7/10 |
| 2019/0229749 A1* | 7/2019 | Sudhakaran | H03M 5/145 |
| 2020/0028720 A1 | 1/2020 | Hollis et al. | |
| 2020/0084072 A1* | 3/2020 | Masuda | H03M 5/145 |
| 2020/0382121 A1* | 12/2020 | Jeong | G11C 11/4096 |

\* cited by examiner

POSTAMBLE FOR MULTI-LEVEL SIGNAL MODULATION

CROSS REFERENCE

The present application for patent claims priority to U.S. Provisional Patent Application No. 62/966,445 by DIETRICH et al., entitled "POSTAMBLE FOR MULTI-LEVEL SIGNAL MODULATION," filed Jan. 27, 2020, assigned to the assignee hereof, and expressly incorporated by reference in its entirety herein.

BACKGROUND

The following relates generally to one or more memory systems and more specifically to a postamble for multi-level signal modulation.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Some memory devices may use multi-level signaling to communicate data between components (e.g., high-bandwidth memory). A multi-level signal may include multiple signal levels that correspond to a respective logical value. For example, a pulse amplitude modulation (PAM) scheme such as PAM4 may be used to encode data into a signal having four distinct levels (e.g., symbols 00, 01, 11, and 10). In some examples, the signal may be transmitted to a device (e.g., a host device) via one or more channels of a bus. After transmitting a last symbol of the signal, the channel(s) used to transmit the signal may be terminated (e.g., actively terminated, passively terminated) to a level corresponding to a highest potential level of the signal (e.g., 10).

In some examples, the last symbol of the signal may correspond to a lowest level (e.g., 00). Thus when the channel is terminated to a highest potential signal level (e.g., 10) a maximum transition may occur. That is, the signal may transition from a lowest potential signal level to a highest potential signal level. Such transitions may introduce relatively large amounts of noise into the signal, which may make the signal more susceptible to errors. Accordingly, reducing the amount of noise caused by maximum transitions in a multi-level signal may be desirable.

Methods and devices for generating a postamble for a multi-level signal are described herein. A postamble may refer to a portion of a signal that is transmitted after a last symbol and before the corresponding channel is terminated or released by the transmitting device. Additionally or alternatively, a postamble may have an intermediate signal level (e.g., 01, 11). By transmitting the postamble via one or more channels of a bus, a maximum transition caused by terminating the channel(s) may be avoided. For example, in some memory systems, the signal may transition from a lowest potential signal level (e.g., 00) to a highest potential signal level (e.g., 10). When a postamble is transmitted, the signal may transition from a lowest potential signal level (or any signal level) to an intermediate signal level (e.g., 01, 11) and then to the highest potential signal level (e.g., the termination level). Including a postamble to prevent maximum transitions caused by terminating a signal may reduce the amount of noise introduced into the signal, which may make the signal less susceptible to errors.

Features of the disclosure are initially described in the context of a memory system and eye diagram, as described with reference to FIGS. 1 and 2. Features of the disclosure are further described in the context of a timing diagram, as described with reference to FIG. 3. These and other features of the disclosure are further illustrated by and described with reference to an apparatus diagram and flowcharts that relate to postamble for multi-level signal modulation as described with references to FIGS. 4-9.

Figure 1:
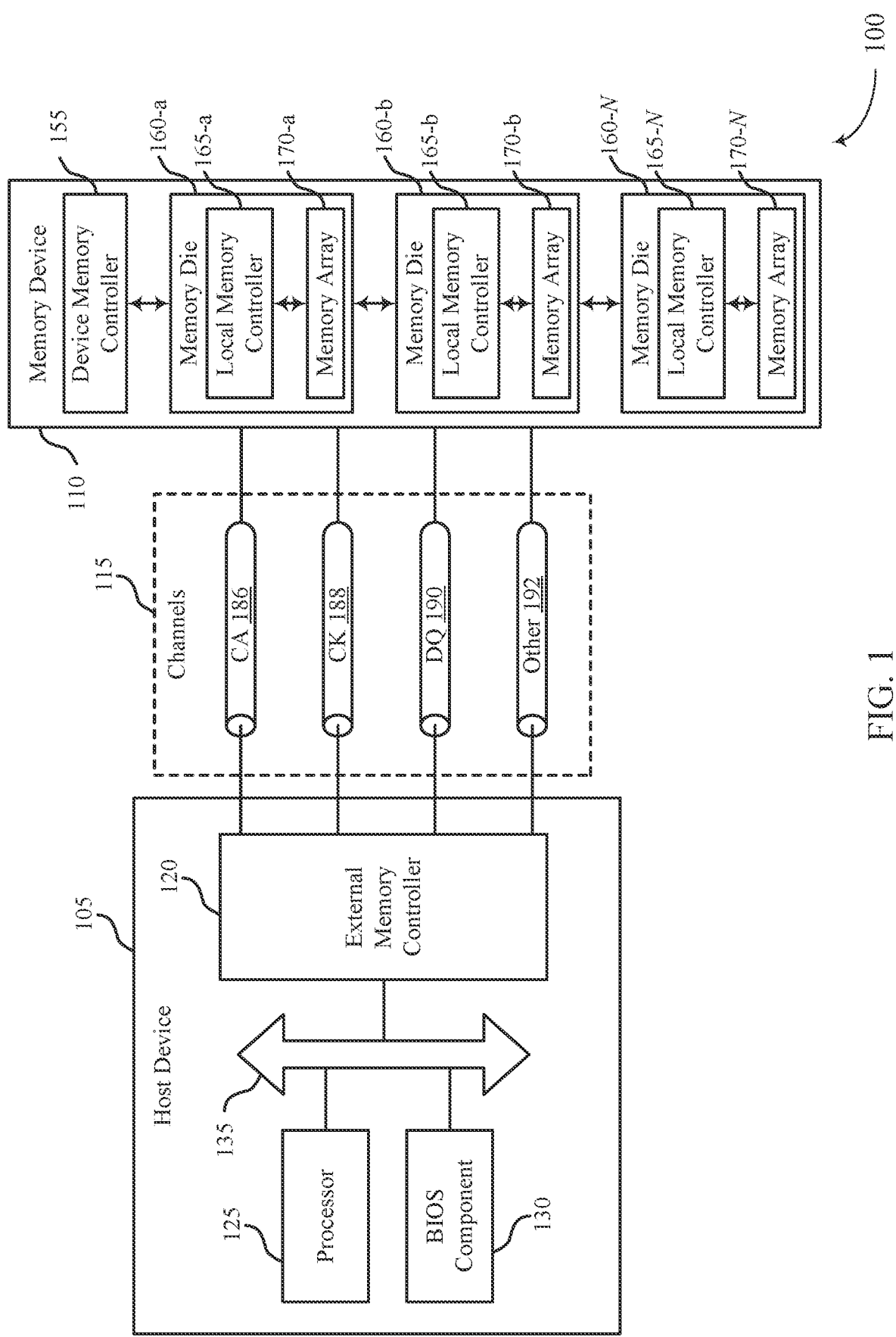
FIG. 1 illustrates an example of a system that supports a postamble for multi-level signal modulation in accordance with examples as disclosed herein.

FIG. 1 illustrates an example of a system 100 that supports a postamble for multi-level signal modulation in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or a system on a chip (SoC), among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105. As discussed herein, the data may be transferred via one or more channels 115 and may be followed by a postamble or termination value, or both. Driving the channels 115 with a postamble following the last symbol of data may prevent maximum transitions between the last symbol of data and termination level of the channel 115.

A local memory controller 165 (e.g., local to a memory die 160) may be operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel. In some examples one or more channels 115 may be driven to a termination level after transmitting data to or from the host device 105 (or memory device 110). Before terminating the one or more channels 115, and after transmitting data, the one or more channels 115 may be driven with a postamble. The postamble may correspond to an intermediate signal level (e.g., a 01 or a 11), which may prevent maximum transitions between the last symbol of data and termination level of the channel 115.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two (2) modulation symbols (e.g., signal levels) of a signal may be registered for each clock cycle (e.g., on both a rising edge and a falling edge of a clock signal).

Signals communicated over the channels 115 may be modulated using one or more different modulation schemes. In some examples, a binary-symbol (or binary-level) modulation scheme may be used to modulate signals communicated between the host device 105 and the memory device 110. A binary-symbol modulation scheme may be an example of a M-ary modulation scheme where M is equal to two (2). Each symbol of a binary-symbol modulation scheme may be operable to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two (2) symbols (e.g., PAM2), and/or others.

In some examples, a multi-symbol (or multi-level) modulation scheme may be used to modulate signals communicated between the host device 105 and the memory device 110. A multi-symbol modulation scheme may be an example of a M-ary modulation scheme where M is greater than or equal to three (3). Each symbol of a multi-symbol modulation scheme may be operable to represent more than one bit of digital data (e.g., a symbol may represent a logic 00, a logic 01, a logic 10, or a logic 11). Examples of multi-symbol modulation schemes include, but are not limited to, PAM3, PAM4, PAM8, etc., quadrature amplitude modulation (QAM), quadrature phase shift keying (QPSK), and/or others. A multi-symbol signal (e.g., a PAM3 signal or a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

As discussed herein, data may be transmitted from a host device 105 to a memory device 110 (e.g., during a write command) or from the memory device 110 to the host device 105 (e.g., during a read command). The data may be transmitted via one or more channels 115, such as the DQ channels 190. The data may be transmitted using a modulation scheme having two or more levels. In a traditional memory system, the channels 115 used for transmitting the data may be terminated to a relatively high signal level (e.g., a termination level such as a logic '10' level). Because the last symbol of data may be a relatively low level for some data bursts (e.g., a logic '00' level), the transition from the last symbol to the termination level may be relatively large for these data bursts. Accordingly, as discussed herein, the channels 115 used for transmitting the data may be driven to a postamble (e.g., an intermediate level such as a logic '01' or '11' level) before reaching the termination level. By driving the channels 115 used for transmitting the data to the postamble level, maximum transitions may be reduced thus reducing the amount of noise introduced into the signal. Reducing signal noise may make the signal less susceptible to errors.

Figure 2:
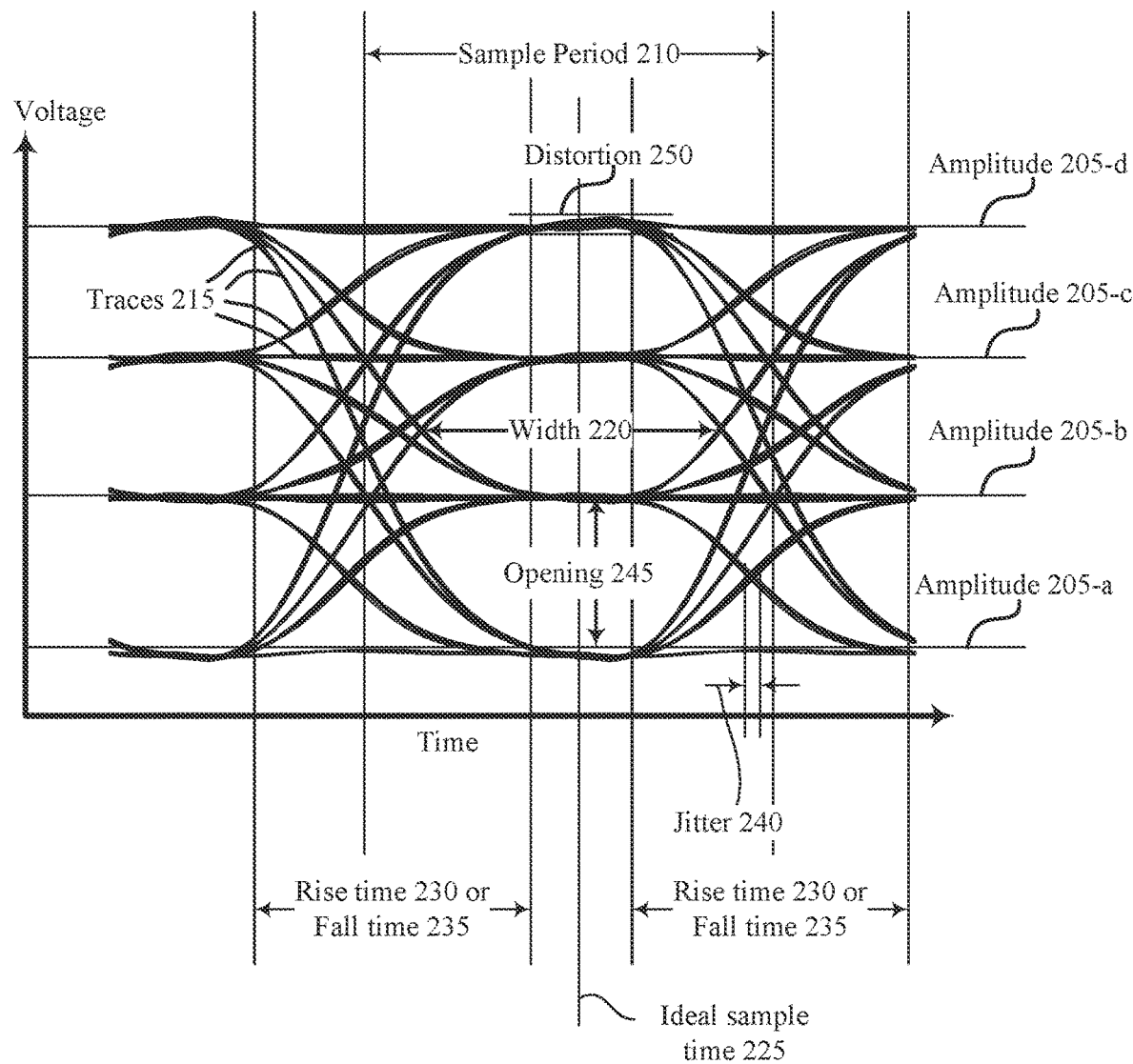
FIG. 2 illustrates an example of an eye diagram that supports a postamble for multi-level signal modulation in accordance with examples as disclosed herein.

FIG. 2 illustrates an example of an eye diagram 200 representing a multi-level signal in accordance with various examples of the present disclosure. The eye diagram 200 may be used to indicate the quality of signals in high-speed transmissions and may represent four (4) symbols of a signal (e.g., '00,' '01,' '10,' or '11'). In some examples, each of the four symbols may be represented by a different voltage amplitude (e.g., amplitudes 205-a, 205-b, 205-c, 205-d). In other examples, the eye diagram 200 may represent a PAM4 signal that may be used to communicate data in a memory device (e.g., memory device 110 as described with reference to FIG. 1). The eye diagram 200 may illustrate signal traces 215 from multiple cycles of a data burst overlaid with each other. The eye diagram may indicate noise margins of the data signal, which may, for example, refer to an amount by which the signal exceeds the ideal boundaries of the amplitudes 205.

In some examples, a width 220 of an eye in the eye diagram 200 may be used to indicate a timing synchronization of the measured signal or jitter effects of the measured signal. In some examples, comparing the width 220 to the sample period 210 may provide a measurement of a signal-to-noise ratio (SNR) of the measured signal. Each eye in an eye diagram may have a unique width based on the characteristics of the measured signal. Various encoding and decoding techniques may be used to modify the width 220 of the measured signal.

In other examples, the eye diagram 200 may indicate an ideal sampling time 225 for determining the value of a logic state represented by a symbol of the measured signal. For example, determining a correct time for sampling data (e.g., timing synchronization) of the measured signal may minimize the error rate in detection of the signal. For example, if a computing device samples a signal during a transition time (e.g., a rise time 230 or a fall time 235), errors may be introduced by the decoder into the data represented by a symbol of the signal. Various encoding and decoding techniques may be used to modify the ideal sampling time 225 of the measured signal.

The eye diagram 200 may be used to identify a rise time 230 or a fall time 235, or both, for transitions from a first amplitude 205 to a second amplitude 205. The slope of the trace 215 during the rise time 230 or fall time 235 may indicate the signal's sensitivity to timing errors. For example, the steeper the slope of the trace 215 (e.g., the smaller the rise time 230 or the fall time 235, or both), the more ideal the transitions between amplitudes 205 are. Various encoding and decoding techniques may be used to modify the rise time 230 or fall time 235, or both, of the measured signal.

In some examples, the eye diagram 200 may be used to identify an amount of jitter 240 in the measured signal. Jitter 240 may refer to a timing error that results from a misalignment of rise and fall times. Jitter 240 occurs when a rising edge or falling edge occurs at a time that is different from an ideal time defined by the data clock. Jitter 240 may be caused by signal reflections, intersymbol interference, crosstalk, process-voltage-temperature (PVT) variations, random jitter, additive noise, or combinations thereof. Various encoding and decoding techniques may be used to modify the jitter 240 of the measured signal. In some cases, the jitter 240 for each signal level or each eye may be different.

In other examples, the eye diagram 200 may indicate an eye opening 245, which may represent a peak-to-peak voltage difference between the various amplitudes 205. The eye opening 245 may be related to a voltage margin for discriminating between different amplitudes 205 of the measured signal. The smaller the margin, the more difficult it may be to discriminate between neighboring amplitudes, and the more errors that may be introduced due to noise. In some cases, a receiver of the signal may compare the signal to one or more threshold voltages positioned between the various amplitudes 205. In other cases, the larger the eye opening 245, the less likely it is that noise will cause the one or more voltage thresholds to be satisfied in error. The eye opening 245 may be used indicate an amount of additive noise in the measured signal and may be used to determine a SNR of the measured signal. Various encoding and decoding techniques may be used to modify the eye opening 245 of the measured signal. In some cases, the eye opening 245 for each eye may be different. In such cases, the eyes of the multi-level signal may not be identical.

In other examples, the eye diagram 200 may indicate distortion 250. The distortion 250 may represent overshoot or undershoot, or both, of the measured signal due to noise or interruptions in the signal path. As a signal settles into a new amplitude (e.g., amplitude 205-b) from an old amplitude (e.g., an amplitude 205-c), the signal may overshoot or undershoot the new amplitude level, or both. In some examples, distortion 250 may be caused by this overshooting or undershooting, or both, and may be caused additive noise in the signal or interruptions in the signal path. Each eye in an eye diagram may have a unique opening based on the characteristics of the measured signal. Various encoding and decoding techniques may be used to modify the distortion 250 of the measured signal. In some cases, the distortion 250 for each signal level or each eye may be different.

The locations of the characteristics of the eye diagram 200 shown in FIG. 2 are for illustrative purposes only. Characteristics such as width 220, sampling time 225, rise time 230, fall time 235, jitter 240, eye opening 245, or distortion 250, or a combination thereof, may occur in other parts of the eye diagram 200 not specifically indicated in FIG. 2.

Figure 3:
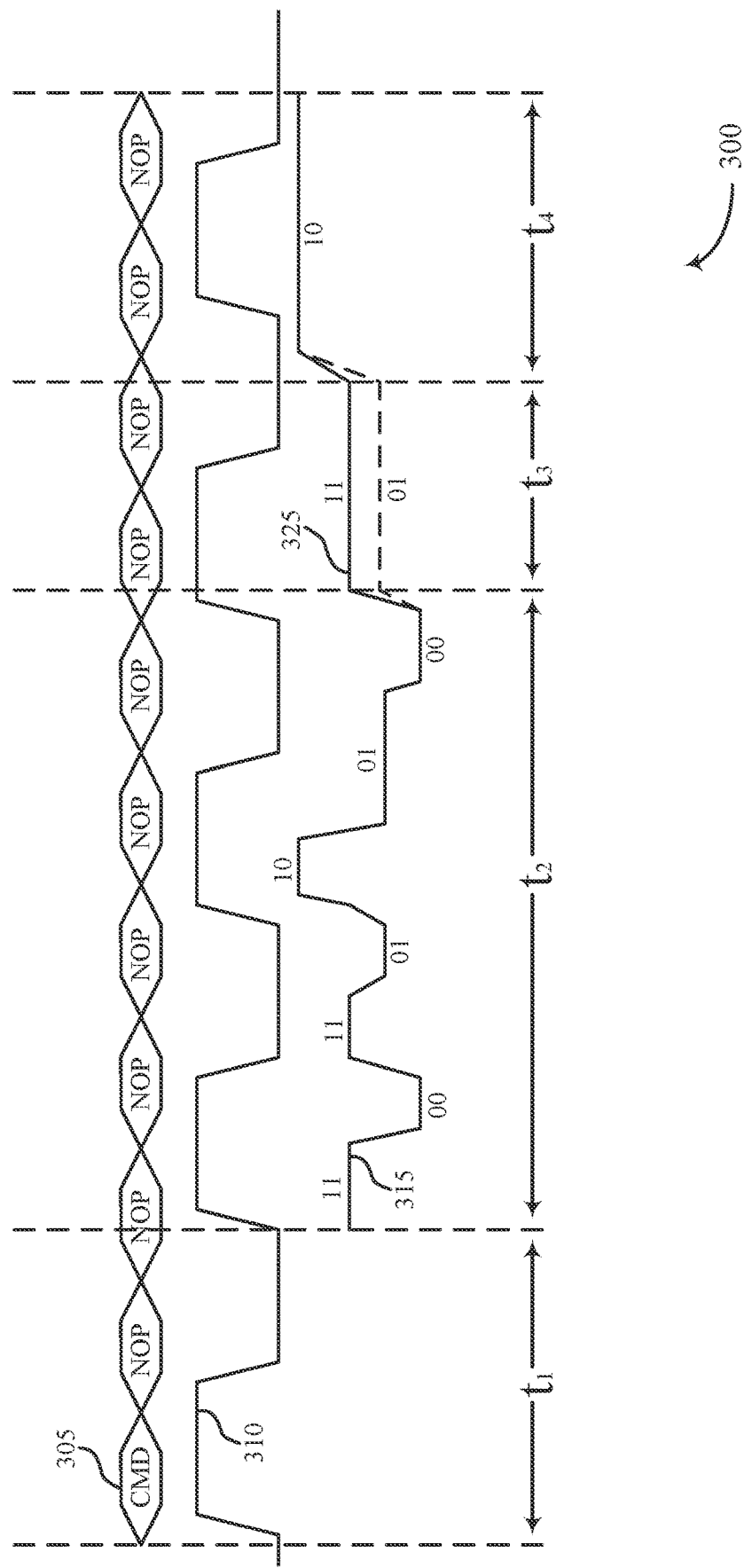
FIG. 3 illustrates an example of a timing diagram that supports a postamble for multi-level signal modulation in accordance with examples as disclosed herein.

FIG. 3 illustrates an example of a timing diagram 300 that supports a postamble for multi-level signal modulation in accordance with examples as disclosed herein. The timing diagram 300 may illustrate generating a postamble for a signal (e.g., a multi-level signal) before the signal is terminated (e.g., passively terminated, driven to a termination level). As described herein, the signal may be transmitted between a first device (e.g., a host device) and a second device (e.g., a memory device) via a bus (e.g., via one or more channels of the bus). The timing diagram 300 may illustrate a command string 305, a clock signal 310, and a multi-level signal 315. By transmitting a postamble before the bus reaches a termination level, relatively less noise may be introduced into the multi-level signal 315, which may make the multi-level signal 315 less susceptible to errors.

In a first example, a postamble may be generated by a host device (e.g., a host device 105 as described with reference to FIG. 1) and may be transmitted to a memory device (e.g., a memory device 110 as described with reference to FIG. 1). The postamble may be transmitted for one or more channels of a bus (e.g., a plurality of channels 115 as described with reference to FIG. 1). That is, a bus may include multiple channels, and the postamble may be transmitted vie each of the multiple channels. For example, the postamble may be transmitted via one or more DQ channels (e.g., DQ channels 190 as described with reference to FIG. 1).

During time $t_1$, the host device may issue a command burst (e.g., for a write command (CMD)) in the command string 305. The command may indicate, to the memory device, that data is to be written to one or more memory cells. In some examples, the host device may not issue any subsequent commands to the memory device until the access operation (e.g., the write operation) is complete.

During time $t_2$, the host device may begin transmitting data (e.g., begin a burst of data) to the memory device via the bus (e.g., via one or more channels of the bus). The data may be transmitted via the multi-level signal 315, which may include two or more signal levels. In some cases of multi-level signaling, the amplitude of the signal may be used to generate the different symbols. For example, when using PAM4 signaling, a first amplitude level may represent a '10,' a second amplitude level may represent a '11,' a third amplitude level may represent a '01,' and a fourth amplitude level may represent a '00.' In some examples, the fourth level (e.g., 00) may represent a lowest amplitude level and the first level (e.g., 10) may represent a highest amplitude level. Memory cells of the memory device may be programmable to store different states. For example, each memory cell may be programmed to store two or more logic states (e.g., a logic '0,' a logic '1,' a logic '00,' a logic '01,' a logic '10,' a logic '11,'). Although a PAM4 modulation scheme is described herein, other multi-symbol modulation schemes may be used. For example, modulation schemes such as PAM3 or PAM8 may be used.

During time $t_2$, the data may be transmitted to the memory device according to the clock signal 310 (e.g., according to a clock cycle). Each clock cycle may correspond to, for example, four symbol periods. That is, four symbols of data may be transmitted during one clock cycle. In other examples, a greater or lesser quantity of symbols may be transmitted during one clock cycle. The memory device receiving the command string 305 may include one or more devices (e.g., a memory controller) to determine the length of the burst. For example, a memory controller may receive the command string 305 and determine how many symbols are included in the burst. Determining the length of the burst may allow for the memory device to cut off (e.g., ignore) data associated with a postamble or termination level, or both.

Various symbols may be transmitted from the host device to the memory device during $t_2$. For example, the multi-level signal 315 may include a second signal level (e.g., an intermediate signal level, '11'), followed by a fourth signal level (e.g., a lowest signal level, '00'), a second signal level, a third signal level (e.g., an intermediate signal level, '01'), a first signal level (e.g., a highest signal level, '10'), a third signal level (e.g., 01), and a fourth signal level (e.g., 00). The symbols transmitted from the host device to the memory device during $t_2$ of FIG. 3 are meant for exemplary purposes, and any combination of symbols may be transmitted in the multi-level signal. In some examples, at the end of time $t_2$, the write command may be completed. That is, the last symbol transmitted during time $t_2$ may represent the last portion of data written to the memory device associated with the command received at $t_1$.

During time $t_3$, the host device may generate a postamble 325 of the multi-level signal 315. The postamble 325 may correspond to an intermediate signal level, such as a second signal level (e.g., 11) or a third signal level (e.g., 01). Although the postamble 325 may not be associated with data being written to the memory device (e.g., the memory device may ignore the postamble), the channel(s) used to transmit the multi-level signal 315 may be driven to the second signal level (e.g., 11) or the third signal level (e.g., 01) for one or more symbol periods associated with the postamble 325. Driving the channel to one of these levels may prevent a maximum transition between the last symbol of data (e.g., transmitted during a last symbol period of time $t_2$) and a termination level of the multi-level signal 315 (e.g., during $t_4$). Because the termination level may be a relatively high value (e.g., first value 10), a maximum transition may occur when the last symbol of data is a relatively low value (e.g., a fourth value 00). Abruptly transitioning from a lowest signal level to a highest signal level may introduce undesirable noise into the multi-level signal 315. Accordingly, by driving the channel(s) with the postamble 325 during time $t_3$, the multi-level signal 315 may transition to an intermediate level (e.g., 01 or 11) before reaching a termination level. Driving the channel(s) with the postamble 325 at $t_3$ may reduce the amount of noise in the multi-level signal 315, which may reduce the potential for errors when transmitting data.

During time $t_4$, the channel(s) for transmitting the multi-level signal 315 may be terminated. That is, the channel(s) may be released by the host device or driven to a termination level (e.g., the first signal level '10'), or both. In some examples, the host device may actively drive the channel(s) to the termination level for the duration of $t_4$ (e.g., until another burst). In other examples, the host device may drive the channel(s) for a portion of $t_4$, and the host device may drive a high impedance (e.g., tri-state) the channel(s) for the remainder of $t_4$. In such cases, the channel(s) may be passively terminated to the termination level (e.g., using one or more resistors coupled with the channel(s)). Similar to the postamble, the memory device may know the length of the data burst (e.g., data associated with a write command) and thus may cut off (e.g., ignore) data associated with the termination level. Although the termination level may be a highest potential level (e.g., 10) of the multi-level signal 315, such a termination level is meant for exemplary purposes only. Accordingly, in other examples, the multi-level signal 315 may be terminated to any level.

In a second example, a postamble 325 may be generated by a memory device (e.g., a memory device 110 as described with reference to FIG. 1) and may be transmitted to a host device (e.g., a host device 105 as described with reference to FIG. 1). The postamble 325 may be transmitted over one or more channels of a bus (e.g., a plurality of channels 115 as described with reference to FIG. 1). For example, the postamble 325 may be transmitted via one or more DQ channels (e.g., DQ channels 190 as described with reference to FIG. 1).

During time $t_1$, the memory device may receive a command (e.g., a read command (CMD)) in the command string 305. The command may indicate, to the memory device, that data is to be read from one or more memory cells. In some examples, the memory device may not receive any subsequent commands until the access operation (e.g., the read operation) is complete. The host device receiving data associated with the command string 305 may be configured to determine the length of the burst (e.g., the read burst). For example, the host device may issue a read command and thus may determine how many symbols are to be received in the burst. Determining the length of the burst may allow for the host device to cut off (e.g., ignore) data associated with a postamble or termination value, or both.

During time $t_2$, the memory device may begin transmitting data to the host device via the bus (e.g., via one or more channels of the bus). The data may be transmitted via the multi-level signal 315, which may include two or more signal levels as described herein. For example, the data may be transmitted using a multi-level signal 315 modulated using a PAM3, PAM4, PAM8 (or similar) modulation scheme. During time $t_2$, the data may be transmitted to the host device according to the clock signal 310 (e.g., according to a clock cycle). Each clock cycle may correspond to, for example, four symbol periods. That is, four symbols of data may be transmitted during one clock cycle. In other examples, a greater or lesser quantity of symbols may be transmitted during one clock cycle. In some examples, at the end of time $t_2$, the read command may be completed. That is, the last symbol transmitted during time $t_2$ may represent the last portion of data read from the memory device for the read command received at $t_1$.

During time $t_3$, the memory device may drive the bus (e.g., one or more channels of the bus) with a postamble of the multi-level signal 315. The postamble may correspond to an intermediate signal level, such as a second signal level (e.g., 11) or a third signal level (e.g., 01) that is associated with a voltage in between at least one voltage level of multi-level signal 315 and a termination level. In some examples, the memory device may drive the channel(s) used to transmit the multi-level signal 315 to a level associated with the postamble (e.g., to an intermediate signal level). Accordingly, by driving the channel(s) with a signal level corresponding to the postamble during time $t_3$, the multi-level signal 315 may transition to an intermediate level (e.g., 01 or 11) before reaching a termination level. Driving the channel(s) with the postamble may reduce the amount of noise in the multi-level signal 315, which may reduce the potential for errors when transmitting data.

During time $t_4$, the channel(s) for transmitting the multi-level signal 315 may be terminated. That is, the channel(s) may be released by the host device or driven to a termination level (e.g., the first signal level '10'), or both. In some examples, the memory device may actively drive the channel(s) to the termination level for the duration of $t_4$. For example, the memory device may include circuitry (e.g., an active driver) that is configured to pull up the channels (e.g., pull up the signal level of the channel to a termination level). In other examples, the memory device may drive (e.g., pull-up) the signal level to the termination level for a portion of $t_4$, and then drive a high impedance state for the remainder of $t_4$. In some cases, the channel(s) may be passively terminated (e.g., using one or more resistors coupled with the channel(s)) to the termination level.

Similar to the memory device, the host device may know the length of the data burst (e.g., data associated with a read command) and thus may cut off (e.g., ignore) signal values associated with the postamble and termination level. Although the termination level may be a highest potential level (e.g., 10) of the multi-level signal 315, such a termination level is meant for exemplary purposes only. Accordingly, in other examples, the multi-level signal 315 may be terminated to any level.

Additionally or alternatively, the memory device may include one or more components configured transmit data or generate a postamble, or both. For example, the memory device may include a processor that is configured to generate data bits for outputting via a driver. The processor may identify data bits based on receiving a command (e.g., a read command) and may generate a multi-level signal 315 for transmitting the bits. In some examples, the processor may append (e.g., insert) one or more bits—that correspond to a postamble—into a data stream associated with the multi-level signal 315. Thus the bits may correspond to an intermediate level (e.g., 01, 11) to avoid a maximum transition between the last symbol of data and the termination level of the channel(s). As described herein, inserting a postamble 325 to a multi-level signal 315 may reduce the amount of noise introduced into the multi-level signal 315, which may make the multi-level signal 315 less susceptible to errors.

Figure 4:
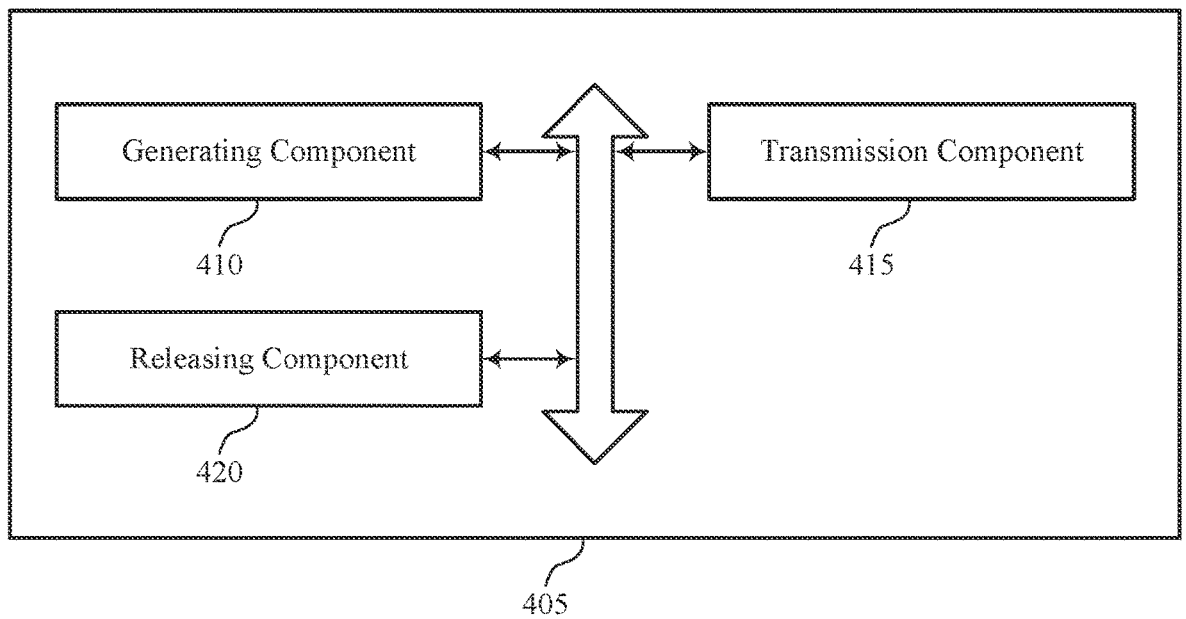
FIG. 4 shows a block diagram of a host device that supports a postamble for multi-level signal modulation in accordance with aspects of the present disclosure.

FIG. 4 shows a block diagram 400 of a host device 405 that supports a postamble for multi-level signal modulation in accordance with examples as disclosed herein. The host device 405 may be an example of aspects of a host device as described with reference to FIGS. 1 and 3. The host device 405 may include a generating component 410, a transmission component 415, and a releasing component 420. Each of these modules may communicate, directly or indirectly, with one another (e.g., via one or more buses).

The generating component 410 may generate, at a first device, a first signal modulated using a modulation scheme having first device more than two levels for transmission to a second device over a channel, where the channel is terminated to a first level. In some examples, the generating component 410 may generate a second signal including a level that is between the first level and one or more of the more than two levels based on generating the first signal. In some examples, the generating component 410 may generate, at the first device, a third signal including the first level.

The transmission component 415 may transmit the first signal and the second signal to the second device over the channel. In some examples, the transmission component 415 may transmit the third signal after transmitting the second signal. In some examples, the transmission component 415 may transmit the second signal to the second device for at least one symbol period after transmitting the first signal.

In some cases, the modulation scheme includes the first level, a second level, a third level, and a fourth level, and where the first level includes a highest level and the fourth level includes a lowest level. In some cases, the second signal includes the second level or the third level.

The releasing component 420 may release the channel after transmitting the third signal.

Figure 5:
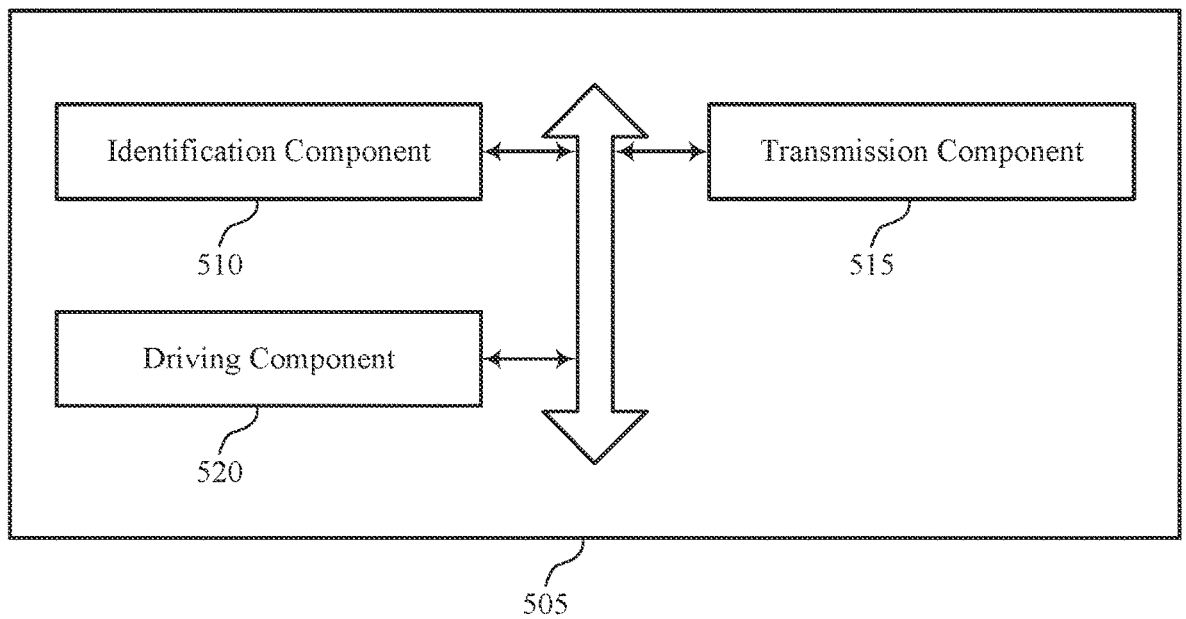
FIG. 5 shows a block diagram of a memory device that supports a postamble for multi-level signal modulation in accordance with aspects of the present disclosure.

FIG. 5 shows a block diagram 500 of a memory device 505 that supports a postamble for multi-level signal modulation in accordance with examples as disclosed herein. The memory device 505 may be an example of aspects of a memory device as described with reference to FIGS. 1-3. The memory device 505 may include an identification component 510, a transmission component 515, and a driving component 520. Each of these modules may communicate, directly or indirectly, with one another (e.g., via one or more buses).

The identification component 510 may identify a command associated with data for transmission from a first device to a second device.

The transmission component 515 may transmit the data via a channel coupled with the first device and the second device, where the data is transmitted using a signal modulated with a modulation scheme having more than two levels over a set of symbol periods.

The driving component 520 may drive the channel to a level that is between a highest of the more than two levels and a lowest of the more than two levels for at least one symbol period after the set of symbol periods based on transmitting the data. In some examples, the driving component 520 may drive the channel to the highest of the more than two levels after driving the channel to the level that is between the highest of the more than two levels and the lowest of the more than two levels. In some examples, the driving component 520 may drive the channel to a high impedance state after driving the channel to the highest of the more than two levels.

In some examples, driving the channel to the highest of the more than two levels includes driving the channel to the highest of the more than two levels for at least one additional symbol period after the at least one symbol period. In some examples, driving the channel to the level includes driving the channel to the second signal level or the third signal level. In some cases, the more than two levels include a first signal level, a second signal level, a third signal level, and a fourth signal level, and where the first signal level includes the highest of the more than two levels and the fourth signal level includes the lowest of the more than two levels.

Figure 6:
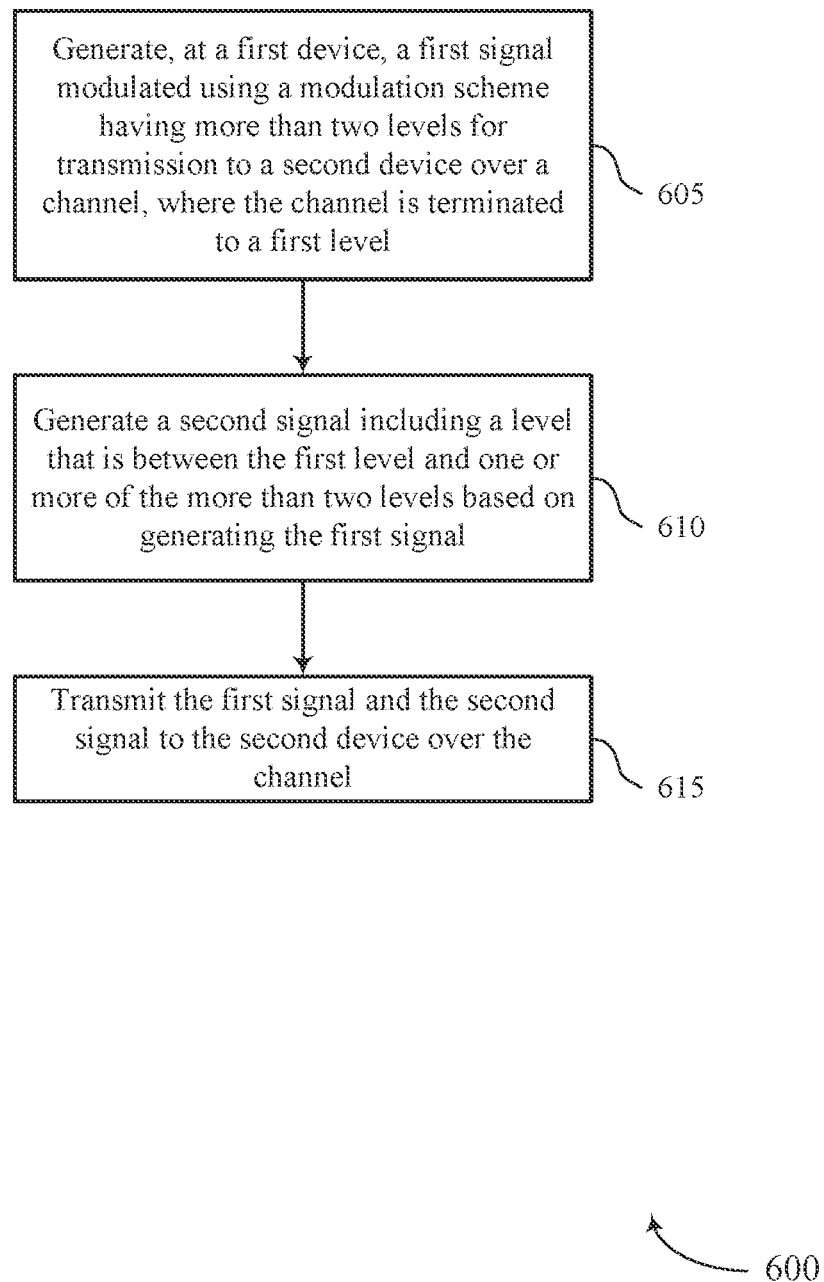
FIGS. 6 through 9 show flowcharts illustrating a method or methods that support postamble for multi-level signal modulation in accordance with examples as disclosed herein.

FIG. 6 shows a flowchart illustrating a method or methods 600 that supports a postamble for multi-level signal modulation in accordance with aspects of the present disclosure. The operations of method 600 may be implemented by a host device or its components as described herein. For example, the operations of method 600 may be performed by a host device as described with reference to FIG. 4. In some examples, a host device may execute a set of instructions to control the functional elements of the host device to perform the described functions. Additionally or alternatively, a host device may perform aspects of the described functions using special-purpose hardware.

At 605, a first signal modulated using a modulation scheme having more than two levels for transmission to a second device over a channel may be generated at a first device. In some examples, the channel may be terminated to a first level. The operations of 605 may be performed according to the methods described herein. In some examples, aspects of the operations of 605 may be performed by a generating component as described with reference to FIG. 4.

At 610, a second signal including a level that is between the first level and one or more of the more than two levels may be generated based on generating the first signal. The operations of 610 may be performed according to the methods described herein. In some examples, aspects of the operations of 610 may be performed by a generating component as described with reference to FIG. 4.

At 615, the first signal and the second signal may be transmitted to the second device over the channel. The operations of 615 may be performed according to the methods described herein. In some examples, aspects of the operations of 615 may be performed by a transmission component as described with reference to FIG. 4.

In some examples, an apparatus as described herein may perform a method or methods, such as the method 600. The apparatus may include features, means, or instructions (e.g., a non-transitory computer-readable medium storing instructions executable by a processor) for generating, at a first device, a first signal modulated using a modulation scheme having more than two levels for transmission to a second device over a channel, where the channel is terminated to a first level, generating a second signal including a level that is between the first level and one or more of the more than two levels based on generating the first signal, and transmitting the first signal and the second signal to the second device over the channel.

Some examples of the method 600 and the apparatus described herein may further include operations, features, means, or instructions for generating, at the first device, a third signal including the first level, and transmitting the third signal after transmitting the second signal.

Some examples of the method 600 and the apparatus described herein may further include operations, features, means, or instructions for releasing the channel after transmitting the third signal.

Some examples of the method 600 and the apparatus described herein may further include operations, features, means, or instructions for transmitting the second signal to the second device for at least one symbol period after transmitting the first signal.

In some examples of the method 600 and the apparatus described herein, the modulation scheme includes the first level, a second level, a third level, and a fourth level, and where the first level includes a highest level and the fourth level includes a lowest level.

In some examples of the method 600 and the apparatus described herein, the second signal includes the second level or the third level.

Figure 7:
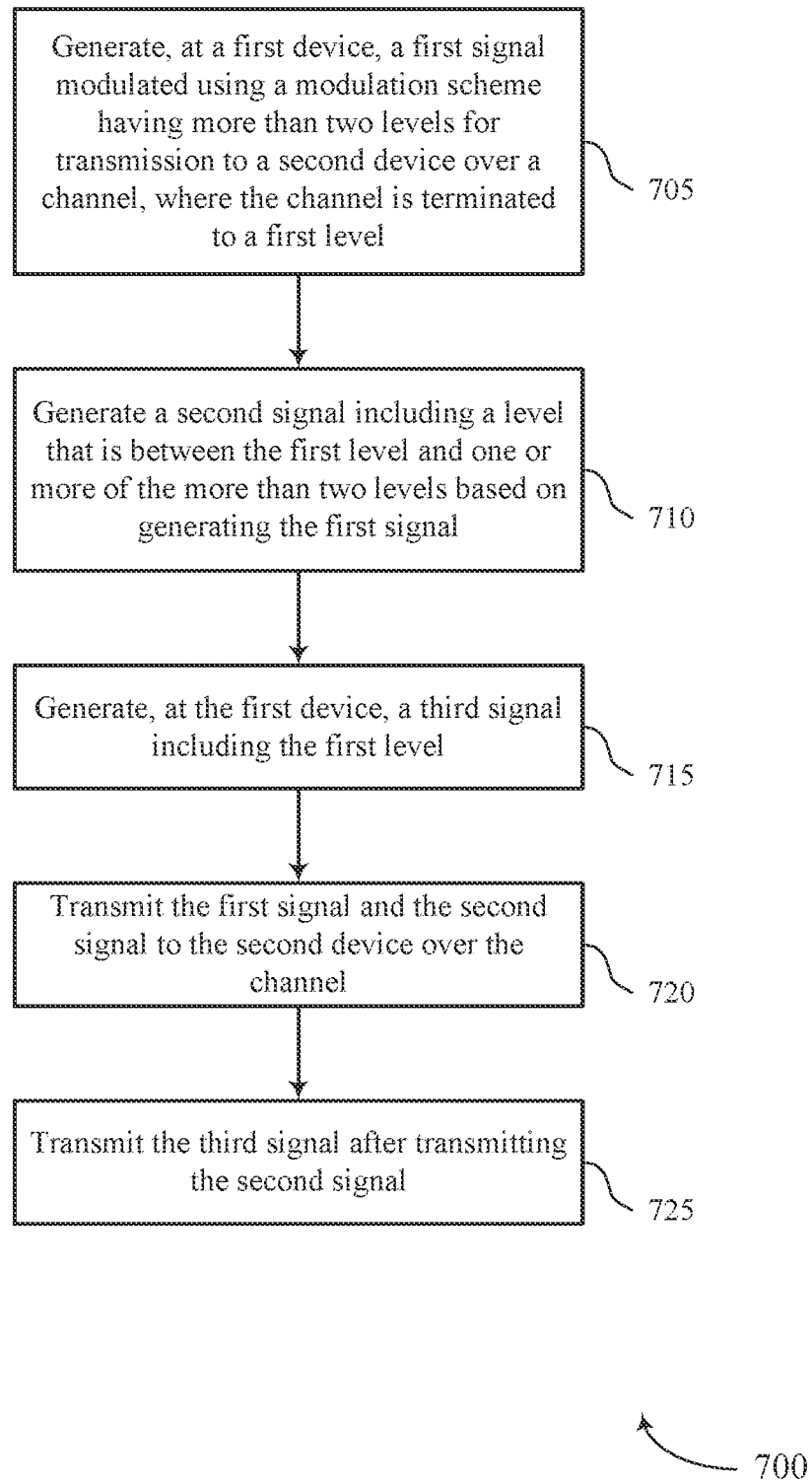

FIG. 7 shows a flowchart illustrating a method or methods 700 that supports a postamble for multi-level signal modulation in accordance with aspects of the present disclosure. The operations of method 700 may be implemented by a host device or its components as described herein. For example, the operations of method 700 may be performed by a host device as described with reference to FIG. 4. In some examples, a host device may execute a set of instructions to control the functional elements of the host device to perform the described functions. Additionally or alternatively, a host device may perform aspects of the described functions using special-purpose hardware.

At 705, a first signal modulated using a modulation scheme having more than two levels for transmission to a second device over a channel may be generated at a first device. In some examples, the channel may be terminated to a first level. The operations of 705 may be performed according to the methods described herein. In some examples, aspects of the operations of 705 may be performed by a generating component as described with reference to FIG. 4.

At 710, a second signal including a level that is between the first level and one or more of the more than two levels may be generated based on generating the first signal. The operations of 710 may be performed according to the methods described herein. In some examples, aspects of the operations of 710 may be performed by a generating component as described with reference to FIG. 4.

At 715, a third signal including the first level may be generated. The operations of 715 may be performed according to the methods described herein. In some examples, aspects of the operations of 715 may be performed by a generating component as described with reference to FIG. 4.

At 720, the first signal and the second signal may be transmitted to the second device over the channel. The operations of 720 may be performed according to the methods described herein. In some examples, aspects of the operations of 720 may be performed by a transmission component as described with reference to FIG. 4.

At 725, the third signal may be transmitted after transmitting the second signal. The operations of 725 may be performed according to the methods described herein. In some examples, aspects of the operations of 725 may be performed by a transmission component as described with reference to FIG. 4.

Figure 8:
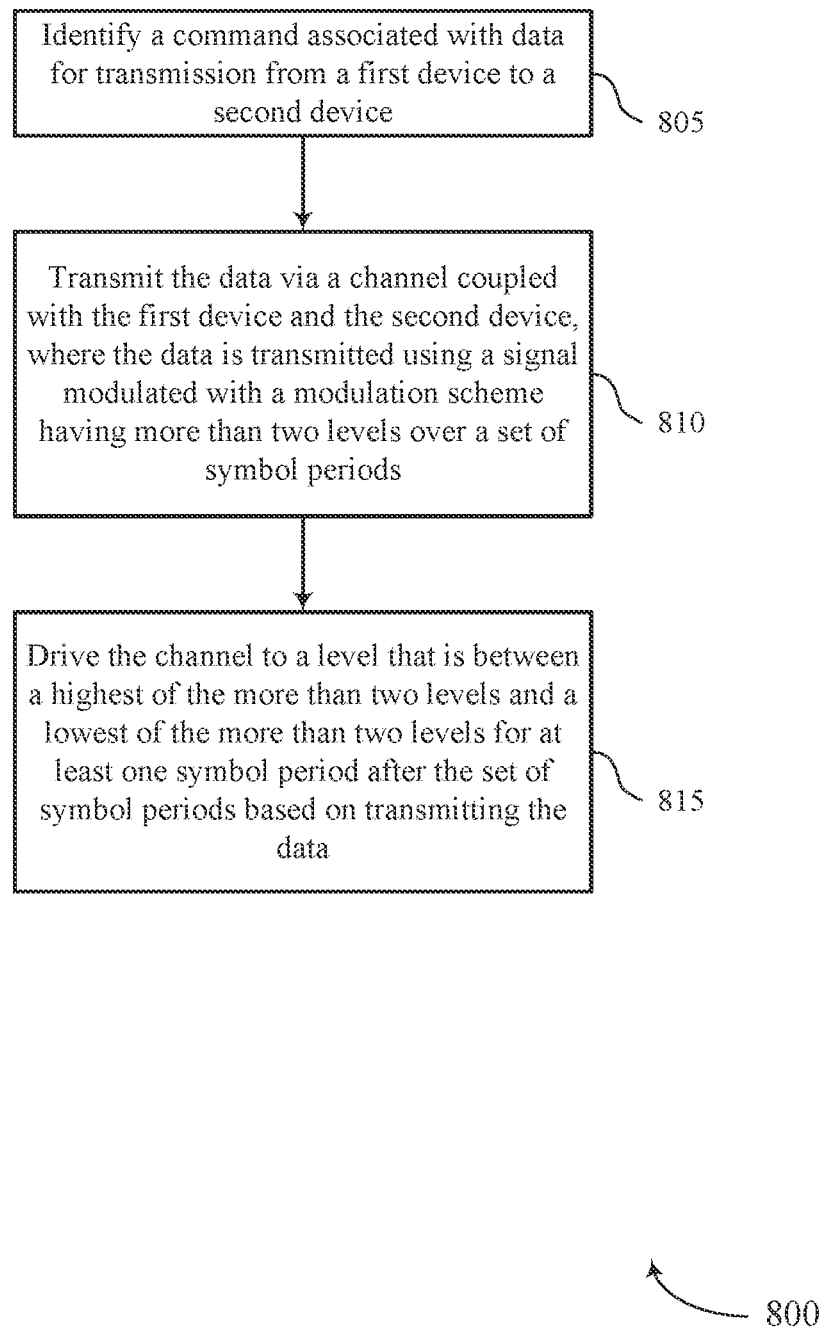

FIG. 8 shows a flowchart illustrating a method or methods 800 that supports a postamble for multi-level signal modulation in accordance with aspects of the present disclosure. The operations of method 800 may be implemented by a memory device or its components as described herein. For example, the operations of method 800 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 805, the memory device may identify a command associated with data for transmission from a first device to a second device. The operations of 805 may be performed according to the methods described herein. In some examples, aspects of the operations of 805 may be performed by an identification component as described with reference to FIG. 5.

At 810, the memory device may transmit the data via a channel coupled with the first device and the second device, where the data is transmitted using a signal modulated with a modulation scheme having more than two levels over a set of symbol periods. The operations of 810 may be performed according to the methods described herein. In some examples, aspects of the operations of 810 may be performed by a transmission component as described with reference to FIG. 5.

At 815, the memory device may drive the channel to a level that is between a highest of the more than two levels and a lowest of the more than two levels for at least one symbol period after the set of symbol periods based on transmitting the data. The operations of 815 may be performed according to the methods described herein. In some examples, aspects of the operations of 815 may be performed by a driving component as described with reference to FIG. 5.

In some examples, an apparatus as described herein may perform a method or methods, such as the method 800. The apparatus may include features, means, or instructions (e.g., a non-transitory computer-readable medium storing instructions executable by a processor) for identifying a command associated with data for transmission from a first device to a second device, transmitting the data via a channel coupled with the first device and the second device, where the data is transmitted using a signal modulated with a modulation scheme having more than two levels over a set of symbol periods, and driving the channel to a level that is between a highest of the more than two levels and a lowest of the more than two levels for at least one symbol period after the set of symbol periods based on transmitting the data.

Some examples of the method 800 and the apparatus described herein may further include operations, features, means, or instructions for driving the channel to the highest of the more than two levels after driving the channel to the level that may be between the highest of the more than two levels and the lowest of the more than two levels.

Some examples of the method 800 and the apparatus described herein may further include operations, features, means, or instructions for driving the channel to a high impedance state after driving the channel to the highest of the more than two levels.

In some examples of the method 800 and the apparatus described herein, driving the channel to the highest of the more than two levels may include operations, features, means, or instructions for driving the channel to the highest of the more than two levels for at least one additional symbol period after the at least one symbol period.

In some examples of the method 800 and the apparatus described herein, the more than two levels include a first signal level, a second signal level, a third signal level, and a fourth signal level, and where the first signal level includes the highest of the more than two levels and the fourth signal level includes the lowest of the more than two levels.

In some examples of the method 800 and the apparatus described herein, driving the channel to the level may include operations, features, means, or instructions for driving the channel to the second signal level or the third signal level.

Figure 9:
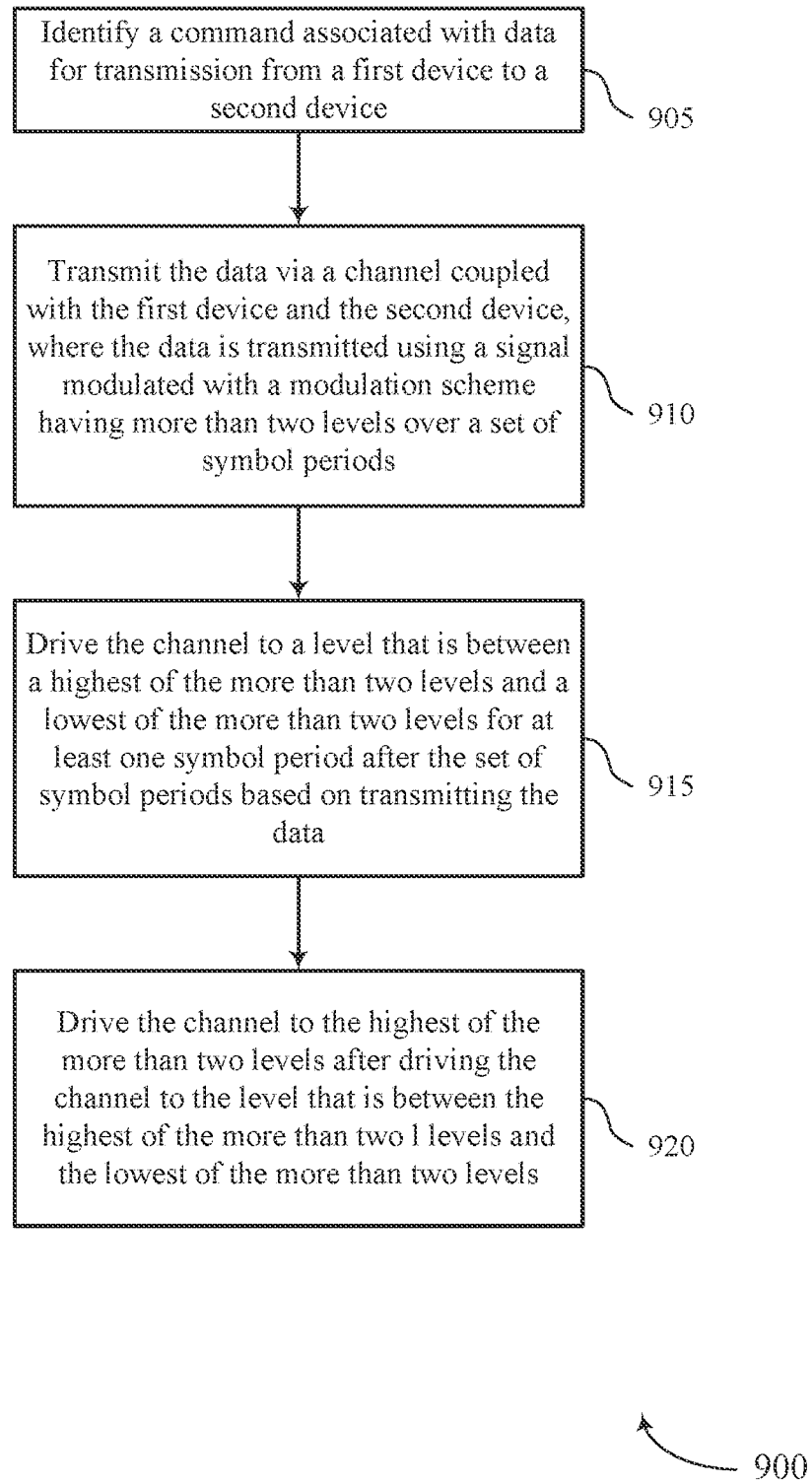

FIG. 9 shows a flowchart illustrating a method or methods 900 that supports a postamble for multi-level signal modulation in accordance with aspects of the present disclosure. The operations of method 900 may be implemented by a memory device or its components as described herein. For example, the operations of method 900 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 905, the memory device may identify a command associated with data for transmission from a first device to a second device. The operations of 905 may be performed according to the methods described herein. In some examples, aspects of the operations of 905 may be performed by an identification component as described with reference to FIG. 5.

At 910, the memory device may transmit the data via a channel coupled with the first device and the second device, where the data is transmitted using a signal modulated with a modulation scheme having more than two levels over a set of symbol periods. The operations of 910 may be performed according to the methods described herein. In some examples, aspects of the operations of 910 may be performed by a transmission component as described with reference to FIG. 5.

At 915, the memory device may drive the channel to a level that is between a highest of the more than two levels and a lowest of the more than two levels for at least one symbol period after the set of symbol periods based on transmitting the data. The operations of 915 may be performed according to the methods described herein. In some examples, aspects of the operations of 915 may be performed by a driving component as described with reference to FIG. 5.

At 920, the memory device may drive the channel to the highest of the more than two levels after driving the channel to the level that is between the highest of the more than two levels and the lowest of the more than two levels. The operations of 920 may be performed according to the methods described herein. In some examples, aspects of the operations of 920 may be performed by a driving component as described with reference to FIG. 5.

It should be noted that the methods described herein describe possible implementations, and that the operations and the steps may be rearranged or otherwise modified and that other implementations are possible. Further, portions from two or more of the methods may be combined.

An apparatus is described. The apparatus may include a controller configured to generate a first signal modulated using a modulation scheme having more than two levels for transmission to a second device over a channel, where the channel is terminated to a first level, generate a second signal including a level that is between the first level and one or more of the more than two levels based on generating the first signal, and an interface coupled with the controller and the channel, the interface configured to transmit the first signal and the second signal via the channel.

In some examples, the interface may be configured to transmit a third signal after the second signal, where the third signal includes the first level. In some examples, the interface may be configured to release the channel after driving the third signal. In some examples, the interface may be configured to transmit the second signal for at least one symbol period after transmitting the first signal.

In some examples, the modulation scheme includes the first level, a second level, a third level, and a fourth level, and where the first level includes a highest level and the fourth level includes a lowest level. In some examples, the second signal includes the second level or the third level.

An apparatus is described. The apparatus may include a data source, a generation component coupled with the data source, the generation component for generating data bits from the data source corresponding to data for transmission from a first device to a second device, a driver coupled with a channel that couples the first device to the second device, the driver for driving the channel with a signal having more than two levels based on a set of bits, a processor coupled with the generation component and the driver, the processor configured to, generate the set of bits based on the data bits, the set of bits including a set of subsets of bits, each of the set of subsets of bits corresponding to a symbol period of a set of symbol periods, append a subset of bits to the set of subsets of bits having a bit value corresponding to a level between a highest of the more than two levels and a lowest of the more than two levels, and output the set of bits to the driver.

In some examples, the processor may be configured to append an additional subset of bits to the set of subsets of bits having a bit value corresponding to a level to which the channel may be terminated. In some examples, the level to which the channel may be terminated includes a highest level of the more than two levels.

In some examples, each of the set of symbol periods may have a same duration. In some examples, the driver includes an enabled state and a high impedance state, and where the processor may be configured to maintain the driver in the enabled state for the appended subset of bits. In some examples, the more than two levels include four levels.

An apparatus is described. The apparatus may include a driver coupled with a host device via a bus and a controller coupled with the driver, the controller configured to cause the apparatus to receive a command for data from the host device, transmit the data via the bus to the host device using a signal modulated with a modulation scheme having more than two levels, and drive the bus to a level that is between a highest of the more than two levels and a lowest of the more than two levels for at least one symbol period following the transmitting the data.

Some examples may further include driving the bus to a first level following driving the bus to the level that may be between the highest of the more than two levels and the lowest of the more than two levels, where the first level and the highest of the more than two levels may be a same level. Some examples may further include ceasing driving the bus to the first level after driving the bus to the first level for a duration.

Some examples may further include receiving a clock signal from the host device, where cycles for the bus may be based on the clock signal, and drive the bus to the level for at least one of the cycles following the transmitting the data. In some examples, the modulation scheme includes a first level, a second level, a third level, and a fourth level, and where the first level includes a highest level and the fourth level includes a lowest signal level. In some examples, the level corresponds to the second level or the third level.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   generating, at a first device, a first signal for transmission of data, the first signal modulated using a modulation scheme having more than two levels for transmission to a second device over a channel, wherein the channel is terminated to a first level;
   generating a second signal subsequent to the first signal comprising a level that is between a highest of the more than two levels and a lowest of the more than two levels based at least in part on generating the first signal for transmission of the data and the channel being terminated to the first level;
   transmitting the first signal and the second signal to the second device over the channel; and
   terminating the channel to the first level.

2. The method of claim 1, further comprising:
   generating, at the first device, a third signal comprising the first level; and
   transmitting the third signal after transmitting the second signal.

3. A method, comprising:
   generating, at a first device, a first signal modulated using a modulation scheme having more than two levels for transmission to a second device over a channel, wherein the channel is terminated to a first level;
   generating a second signal comprising a level that is between the first level and one or more of the more than two levels based at least in part on generating the first signal;
   transmitting the first signal and the second signal to the second device over the channel;
   generating, at the first device, a third signal comprising the first level;
   transmitting the third signal after transmitting the second signal; and
   releasing the channel after transmitting the third signal.

4. The method of claim 1, further comprising:
   transmitting the second signal to the second device for at least one symbol period after transmitting the first signal.

5. The method of claim 1, wherein the modulation scheme comprises the first level, a second level, a third level, and a fourth level, and wherein the first level comprises a highest level and the fourth level comprises a lowest level.

6. The method of claim 5, wherein the second signal comprises the second level or the third level.

7. An apparatus, comprising:
a controller configured to:
generate a first signal for transmission of data, the first signal modulated using a modulation scheme having more than two levels for transmission to a second device over a channel, wherein the channel is terminated to a first level;
generate a second signal subsequent to the first signal comprising a level that is between a highest of the more than two levels and a lowest of the more than two levels based at least in part on generating the first signal for transmission of the data and the channel being terminated to the first level;
an interface coupled with the controller and the channel, the interface configured to transmit the first signal and the second signal via the channel; and
terminate the channel to the first level.

8. The apparatus of claim 7, wherein the interface is configured to transmit a third signal after the second signal, wherein the third signal comprises the first level.

9. An apparatus, comprising:
a controller configured to:
generate a first signal modulated using a modulation scheme having more than two levels for transmission to a second device over a channel, wherein the channel is terminated to a first level;
generate a second signal comprising a level that is between the first level and one or more of the more than two levels based at least in part on generating the first signal; and
an interface coupled with the controller and the channel, the interface configured to transmit the first signal and the second signal via the channel; wherein the interface is configured to transmit a third signal after the second signal, wherein the third signal comprises the first level, and wherein the interface is configured to release the channel after driving the third signal.

10. The apparatus of claim 7, wherein the interface is configured to transmit the second signal for at least one symbol period after transmitting the first signal.

11. The apparatus of claim 7, wherein the modulation scheme comprises the first level, a second level, a third level, and a fourth level, and wherein the first level comprises a highest level and the fourth level comprises a lowest level.

12. The apparatus of claim 11, wherein the second signal comprises the second level or the third level.

13. A method, comprising:
identifying a command associated with data for transmission from a first device to a second device;
transmitting the data via a channel coupled with the first device and the second device, wherein the data is transmitted using a signal modulated with a modulation scheme having more than two levels over a plurality of symbol periods;
driving the channel to a level that is between a highest of the more than two levels and a lowest of the more than two levels for at least one symbol period after the plurality of symbol periods based at least in part on transmitting the data; and
driving the channel to the highest of the more than two levels after driving the channel to the level that is between the highest of the more than two levels and the lowest of the more than two levels.

14. The method of claim 13, further comprising:
driving the channel to a high impedance state after driving the channel to the highest of the more than two levels.

15. The method of claim 13, wherein:
driving the channel to the highest of the more than two levels comprises driving the channel to the highest of the more than two levels for at least one additional symbol period after the at least one symbol period.

16. The method of claim 13, wherein the more than two levels comprise a first signal level, a second signal level, a third signal level, and a fourth signal level, and wherein the first signal level comprises the highest of the more than two levels and the fourth signal level comprises the lowest of the more than two levels.

17. The method of claim 16, wherein:
driving the channel to the level comprises driving the channel to the second signal level or the third signal level.

18. An apparatus, comprising:
a data source,
a generation component coupled with the data source, the generation component for generating data bits from the data source corresponding to data for transmission from a first device to a second device,
a driver coupled with a channel that couples the first device to the second device, the driver for driving the channel with a signal having more than two levels based at least in part on a set of bits, and
a processor coupled with the generation component and the driver, the processor configured to:
receive the data bits from the generation component; and
append an additional subset of bits to a plurality of subsets of bits having a bit value corresponding to a level to which the channel is terminated.

19. The apparatus of claim 18, wherein the level to which the channel is terminated comprises a highest level of the more than two levels.

20. The apparatus of claim 18, wherein the signal is modulated over a plurality of symbol periods, and wherein each of the plurality of symbol periods have a same duration.

21. The apparatus of claim 18, wherein the driver comprises an enabled state and a high impedance state, and wherein the processor is configured to maintain the driver in the enabled state for the appended additional subset of bits.

22. The apparatus of claim 18, wherein the more than two levels comprise four levels.

23. An apparatus, comprising:
a driver coupled with a host device via a bus; and
a controller coupled with the driver, the controller configured to cause the apparatus to:
receive a command for data from the host device;
transmit the data via the bus to the host device using a signal modulated with a modulation scheme having more than two levels;
drive the bus to a level that is between a highest of the more than two levels and a lowest of the more than two levels for at least one symbol period following transmission of the data; and
drive the bus to the highest of the more than two levels following driving the bus to the level that is between the highest of the more than two levels and the lowest of the more than two levels.

24. The apparatus of claim 23, wherein the controller is configured to cause the apparatus to:
cease driving the bus to the highest of the more than two levels after driving the bus to the highest of the more than two levels for a duration.

25. The apparatus of claim 23, wherein the controller is configured to cause the apparatus to:
- receive a clock signal from the host device, wherein cycles for the bus are based at least in part on the clock signal; and
- drive the bus to the level for at least one of the cycles following the transmission of the data.

26. The apparatus of claim 23, wherein the modulation scheme comprises a first level, a second level, a third level, and a fourth level, and wherein the first level comprises a highest level and the fourth level comprises a lowest signal level.

27. The apparatus of claim 26, wherein the level corresponds to the second level or the third level.

* * * * *